(12) United States Patent
Hanks et al.

(10) Patent No.: US 7,058,599 B2
(45) Date of Patent: Jun. 6, 2006

(54) INCREASES IN SALES RANK AS A MEASURE OF INTEREST

(75) Inventors: Steve Hanks, Seattle, WA (US); Daniel Spils, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 739 days.

(21) Appl. No.: 09/809,728

(22) Filed: Mar. 15, 2001

(65) Prior Publication Data

US 2002/0133417 A1 Sep. 19, 2002

(51) Int. Cl.
*G06F 17/60* (2006.01)

(52) U.S. Cl. .......................................... 705/27; 705/26
(58) Field of Classification Search ............. 705/26–27
See application file for complete search history.

(56) References Cited

U.S. PATENT DOCUMENTS

| | | |
|---|---|---|
| 6,411,936 B1 * | 6/2002 | Sanders ........................ 705/10 |
| 6,484,152 B1 * | 11/2002 | Robinson ..................... 705/36 |
| 2002/0004751 A1 * | 1/2002 | Seki et al. .................... 705/20 |

OTHER PUBLICATIONS

Amazon.com: Lowenthal, Mark M.; "It Can Be Tough To Go With the Amazon Flow," Washington Post, Mar. 12, 2000, p. B05, Proquest #50941367, 3pgs.*
Amazon.com: Internet Archive Wayback Machine; www.archive.org; www.amazon.com; Oct. 13, 1999; http://web.archive.org/web/19991013091817/http://amazon.com; 2pgs.*
Amazon.com; O'Briant, Don; "Current Events Can Produce Big, Quick Swings in Rankings," The Atlanta Constitution, Aug. 24, 1998, p. B05.05, Proquest #33416377, 2pgs.*
Amazon.com: Husted, Bill; "DVDs, Videotapes Always Good Fit for Online Shopping," The Atlanta Journal the Atlanta Constitution, Jan. 30, 2000, p. Q3; Proquest #48588898, 3pgs.*
UU: Fast50: Behr, Peter; "Finding Riches in Niches; Technology Sector Growth Often Matched by Rapid Rise in Revenue," The Washington Post, Jan. 19, 1998, p. F06, Proquest #44790489, 3pgs.*
VV: Fast50: Internet Archive Wayback Machine; www.archive.org; www.washingtontechnology.com; Feb. 8, 1999; http://web.archive.org/web/19990208010823/http://washingtontechnology.com; 7pgs.*
WW: Tanaka, Jenifer; "The Web's Best Friends," Newsweek, Mar. 13, 2000, v135n11 p. 70; Proquest #50847931, 3pgs.*

* cited by examiner

*Primary Examiner*—Robert M. Pond
(74) *Attorney, Agent, or Firm*—Perkins Coie LLP

(57) ABSTRACT

A facility for displaying consumption information about items is described. The facility uses a current consumption rank for each of a number of items and at least one or more previous consumption ranks for each of these items to attribute to at least a portion of the items a score characterizing the magnitude of increase in the consumption rank of the item. The facility then generates a display incorporating at least a portion of the attributed scores in the corresponding items.

18 Claims, 6 Drawing Sheets sales rank table — 400

| sales rank this hour | number of sales in 24-hour period ending with this hour | item |
|---|---|---|
| 1 | 5669 | Icy Sparks |
| 2 | 5608 | Harry Potter Schoolbooks |
| 3 | 5607 | 1st to Die |
| 4 | 5598 | The Wisdom of Menopause |
| 5 | 5594 | We Were the Mulvaneys |
| 6 | 5593 | Harry Potter and the Order of the Phoenix (Book 5) |
| 7 | 5588 | Beyond Valor |
| 8 | 5588 | A Painted House |
| 9 | 5563 | Scarlet Feather |
| 10 | 5561 | The Bonesetter's Daughter |
| 11 | 5557 | Whistle While You Work |
| 12 | 5532 | Peer to Peer |
| 13 | 5529 | Who Moved My Cheese? |
| 14 | 5524 | The Prayer of Jabez |
| 15 | 5520 | Dreamcatcher |
| 16 | 5519 | Life Strategies |
| 17 | 5513 | The Red Tent |
| 18 | 4941 | The Vendetta Defense |
| 19 | 4939 | Whistler's Angel |
| 20 | 4986 | House of Sand and Fog |
| 21 | 4960 | Body for Life |
| 22 | 4953 | Shackleton's Way |
| 23 | 4951 | Harry Potter and the Prisoner of Azkaban (Book 3) |
| 24 | 4946 | Longaberger |
| 25 | 4937 | Harry Potter and the Goblet of Fire (Book 4) |
| ... | ... | ... |

431　432　433

*Fig. 4* sales acceleration table — 500

| acceleration score | item | h₋₁ | h₋₂ | h₋₃ | h₋₄ | h₋₅ | h₋₆ | h₋₇ | h₋₈ | h₋₉ | h₋₁₀ | h₋₁₁ | h₋₁₂ | h₋₁₃ | h₋₁₄ | h₋₁₅ | h₋₁₆ | h₋₁₇ | h₋₁₈ | h₋₁₉ | h₋₂₀ | h₋₂₁ | h₋₂₂ | h₋₂₃ | h₋₂₄ |
|---|---|---|---|---|---|---|---|---|---|---|---|---|---|---|---|---|---|---|---|---|---|---|---|---|---|
| 26,200% | Icy Sparks | 1 | 6 | 19 | 35 | 72 | 91 | 141 | 138 | 155 | 159 | 159 | 191 | 194 | 199 | 202 | 204 | 201 | 209 | 208 | 211 | 219 | 233 | 263 | 261 |
| 2,309% | Shackleton's Way | 22 | 23 | 63 | 65 | 191 | 210 | 263 | 275 | 278 | 390 | 414 | 463 | 447 | 476 | 480 | 495 | 505 | 514 | 512 | 527 | 526 | 527 | 529 | 528 |
| 801% | While I Was Gone | 83 | 101 | 136 | 193 | 201 | 262 | 275 | 301 | 355 | 748 | 590 | 611 | 623 | 654 | 701 | 684 | 725 | 723 | 741 | 732 | 744 | 720 | 693 | 705 |

*Fig. 5*

INCREASES IN SALES RANK AS A MEASURE OF INTEREST

TECHNICAL FIELD

The present invention is directed to the field of sales and ordering data portrayal.

BACKGROUND

Web merchants sell items such as products, services, and data via the World Wide Web ("the Web"). Because most items sold by a web merchant result in a profit, measured by the amount by which the item's price exceeds its cost, web merchants have a strong incentive to increase the rate at which they sell items.

It is common for web merchants to design their web sites to include content that helps to draw interest to the web sites and to particular items in order to increase the number of customers that may buy these items. As an example, some web merchants include a bestseller list on their web sites.

A bestseller list is a list of items sold by the web merchant in the largest numbers during a preceding period of time. For example, a web merchant that sells books may display a list of the 100 books that sold the most copies over the preceding 24 hours. This list of books is typically sorted such that the book that sold the most copies is listed first, the book that sold the second-most number of copies is listed second, etc. Each book may also be accompanied by a value called "sales rank," where a sales rank of 1 accompanies the book that sold the most copies, a sales rank of 2 accompanies the book that sold the second-most number of copies, etc.

While bestseller lists can draw customer interest to books that are selling the largest numbers of copies, and thus have achieved the most substantial overall popularity, they also leave something to be desired. For example, because bestseller lists may be slow to change, they fail to reward customers that return to view them frequently, such as a number of times in a single day. This slow change rate also has the result of concentrating the promotional benefits on a few items, rather than distributing those benefits over a larger number of items. Additionally, bestseller lists reflect high-popularity items that have "made it," rather than those whose popularity is growing, and are "up and corners."

Accordingly, a feature on a merchant web site that overcame some or all of the aforementioned shortcomings of bestseller lists would have significant utility.

BRIEF DESCRIPTION OF THE DRAWINGS

FIG. 4 is a table diagram showing an example of a sales rank table containing information about sales ranks for a particular period of time in a particular item category.

FIG. 5 is a table diagram showing a typical sales acceleration table used by the facility.

SUMMARY

Figure 1:
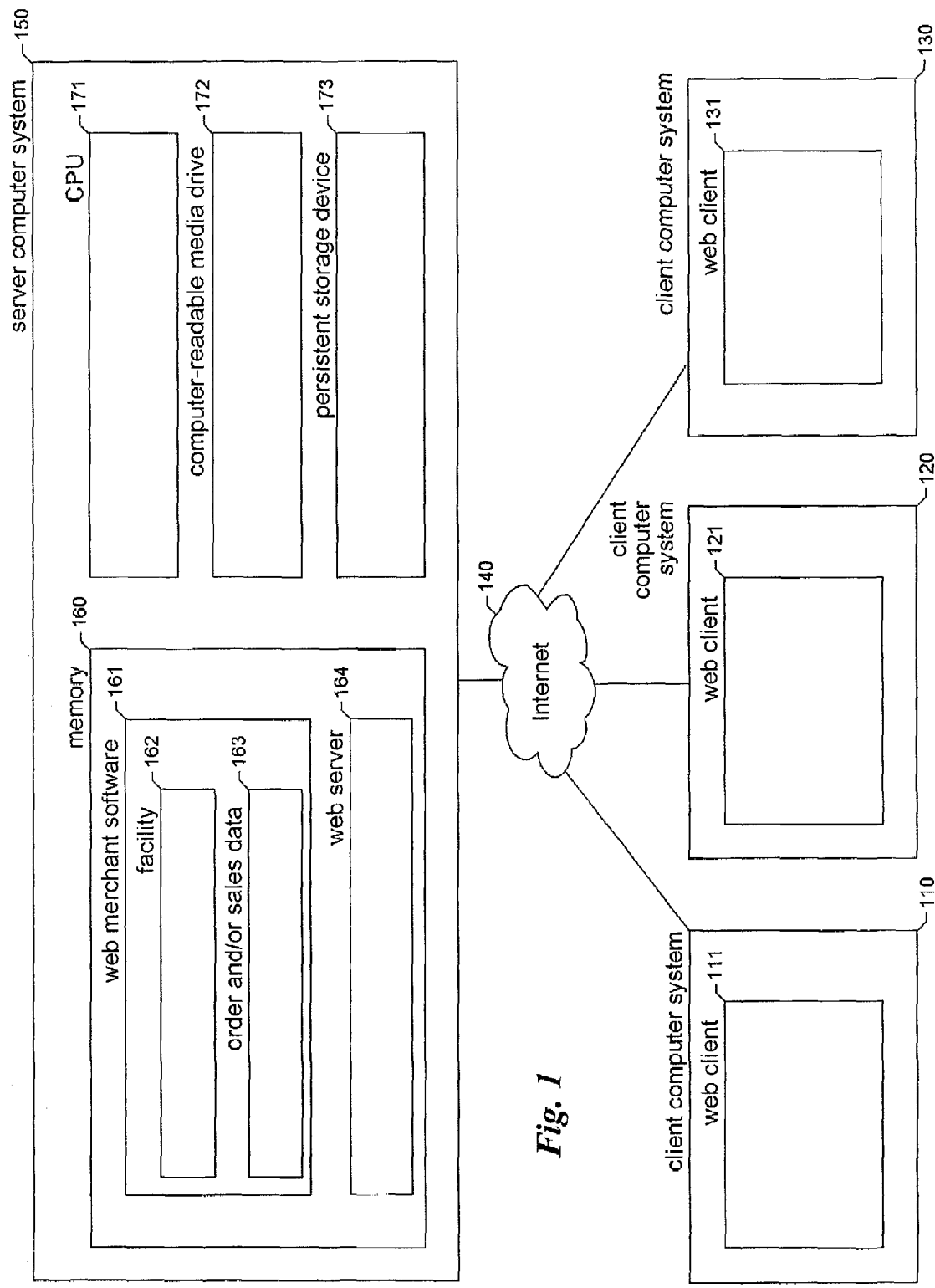
FIG. 1 is a high-level block diagram showing a typical environment in which the facility operates.

A software facility for displaying information about recent increases in the sales rank of items ("the facility") is described. In some embodiments, the facility is used by a web merchant to identify items such as products, services, or data whose sales performance, as measured by a sales ranking—such as a ranking based upon orders placed, a ranking based upon sales completed, or a ranking based upon number of page views—has recently increased the most. This enables the facility to identify popular items earlier than a bestseller list based solely on sales rank. It bears noting that sales rankings, as they are described herein, become better as their values become smaller. That is, the item having the sales rank value 1 has the highest sales, and items whose sales rank values are larger have lower sales.

In some embodiments, the facility attributes scores to items that measure the recent increase in their sales ranks. While a variety of different formulae may be used to compute such a score, one such formula involves dividing the difference between the current ranking value for an item and the largest (worst) ranking value for the item over the course of the past day by the current ranking value for the item. Using this formula, if the current ranking value for an item is 5, and its ranking value for the past day has varied between the extremes of 5 and 95, the item's score is (95−5)/5, or 18, which may also be expressed as 1800%. Another such formula involves dividing the difference between the current ranking value for an item and the largest ranking value for the item over the course of the past day by the largest ranking value for the item over the course of the past day. Using this formula, if the current ranking value for an item is 5, and its ranking value for the past day has varied between the extremes of 5 and 95, the item's score is (95−5)/95, or 0.947, which may also be expressed as 94.7%.

In various embodiments, items having the highest scores—such as the 100 items having the highest scores—are displayed in descending order of their scores. In some embodiments, the scores are displayed in conjunction with the items. This display may be provided to customers and potential customers in a variety of ways, such as by including it on the web merchant's web site, sending it in an electronic mail message or an electronic message of another type, including it in advertisements, etc.

Some embodiments of the facility perform this analysis separately for each of a number of different item categories. For example, a web merchant that sells books, music, and video items may perform this process separately for each of these three item categories. The analysis may also be subdivided using other factors, including but not limited to item subcategories; customer characteristics, such as geographic location or membership in a group; and method used to place the order.

By identifying items whose sales performance has recently increased significantly, the facility generates interest both in the web merchant and in the particular items identified. Because the list of identified items can change substantially in a short period of time, and because this list reflects significant, real-time or near-real-time information about the performance of the web merchant, users are motivated to visit the web merchant's web site frequently to track changes to the list. For example, where an item undergoes a massive increase in sales ranking and has an unusually high score at a particular time, users may be interested in attempting to identify factors—such as a promotional event or the publication of a high-profile positive review—to credit for the increase. The list's substantial rate of change has the further result that a large number of different items appear on the list and enjoy the associated level of promotion. Also, because identification on the list does not require an item to have sales rates among the highest at the web merchant, the list tends to identify popular items earlier than conventional bestseller lists.

DETAILED DESCRIPTION

FIG. 1 is a high-level block diagram showing a typical environment in which the facility operates. The block diagram shows several client computer systems, such as client computer systems 110, 120, and 130. Each of the client computer systems has a web client computer program for browsing the World Wide Web, such as web clients 111, 121, and 131. The client computer systems are connected via the Internet 140 to a server computer system 150 hosting the facility. Those skilled in the art will recognize that client computer systems could be connected to the server computer system by networks other than the Internet, however.

The server computer system 150 contains a memory 160. The memory 160 preferably contains web merchant software 161 incorporating both the facility 162 and order data or other sales data 163 typically used by the facility. The memory preferably further contains a web server computer program 164 for delivering web pages in response to requests from web clients. While items 161–164 are preferably stored in memory while being used, those skilled in the art will appreciate that these items, or portions of them, maybe be transferred between memory and a persistent storage device 173 for purposes of memory management and data integrity. The server computer system further contains one or more central processing units (CPU) 171 for executing programs, such as programs 161–164, and a computer-readable medium drive 172 for reading information or installing programs such as the facility from computer-readable media, such as a floppy disk, a CD-ROM, or a DVD.

While various embodiments are described in terms in the environment described above, those skilled in the art will appreciate that the facility may be implemented in a variety of other environments including a single, monolithic computer system, as well as various other combinations of computer systems or similar devices connected in various ways.

Figure 2:
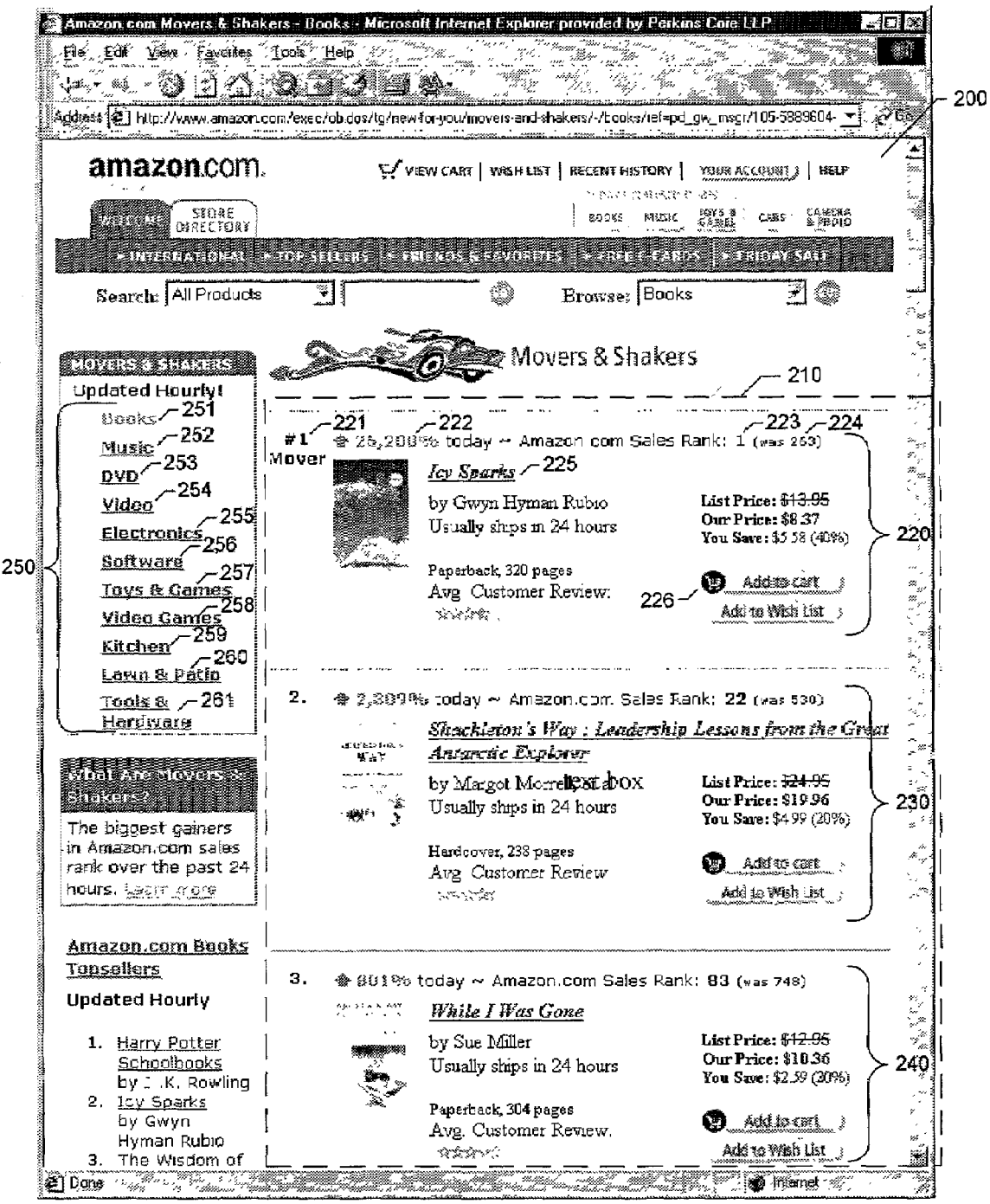
FIG. 2 is a display diagram showing a typical list displayed by the facility of items whose sales performance has recently increased the most.

FIG. 2 is a display diagram showing a typical list displayed by the facility of items whose sales performance has recently increased the most. This list, shown on web page 200, is therein titled "Movers & Shakers." The list 210 contains entries, such as entries 220, 230, and 240, each relating to book items whose sales performance has recently increased the most. For example, entry 220 is directed to a book entitled "Icy Sparks." The entry contains a score 222 computed by the facility for the item, as well as an indication 221 that this is the highest score in this product category. The entry further includes the current sales rank value 223 for the item, as well as the highest (worst) sales rank value 224 attributed to the item in the last 24 hours. The entry also contains additional information about the item, including a link 225 to additional information about the item and a button 226 for ordering the item.

Web page 200 also includes a links section 250 containing links to 251–261 for displaying corresponding item lists for other item categories. For example, the user may click link 259 in order to display a similar list of the Kitchen items whose sales performance has recently increased the most.

Figure 3:
FIG. 3 is a display diagram showing a typical abbreviated display of items whose sales performance has recently increased the most.

FIG. 3 is a display diagram showing a typical abbreviated display of items whose sales performance has recently increased the most. Web page 300 contains Movers & Shakers section 310, which in turn contains a few entries, such as entries 320 and 330. Each of these entries shows a highly-scored item—such as the top-scored item—in a different product category. In some embodimens, these categories are chosen based upon the customer's interests and/or purchase history, while in other embodiments, these categories are randomly selected.

Entry 320 contains information about the music item whose sales ranking has recently increased the most. Entry 320 includes this item's score 321, an indication 323 of the category of the item, here artist and title and information 322 specifically identifying the item, including a link to more information about the item. In addition, Movers & Shakes section 310 includes a link 340 to a more complete display of items whose sales performance has recently increased the most, such as that shown in FIG. 2.

Figure 6:
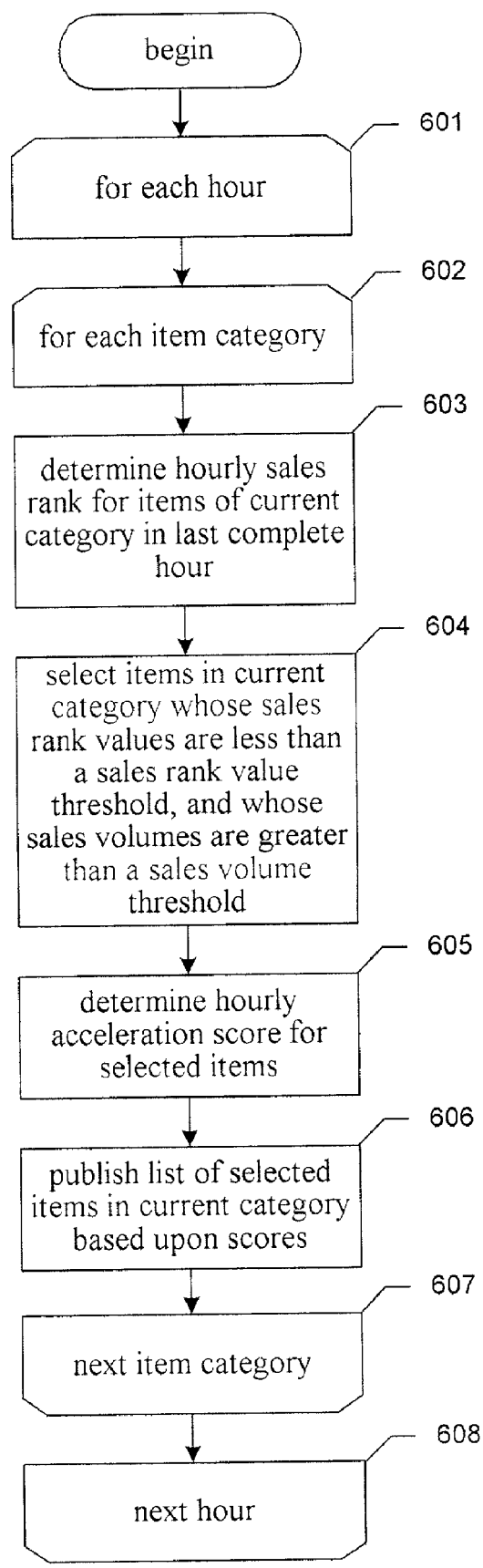
FIG. 6 is a flow diagram showing steps typically performed by the facility in order to score items in item categories to identify items whose sales performance has recently increased the most.

FIGS. 4–6 contain additional details relating to the design and operation of the facility. FIG. 4 is a table diagram showing an example of a sales rank table containing information about sales ranks for a particular period of time in a particular item category. The sales rank table 400 is comprised of rows, such as rows 401–425, each corresponding to an item in the Book item category. Each row is divided into sales rank column 431, a number of sales column 432, and an item identification column 433. Each row indicates the sales rank of the item to which the row corresponds, based upon the number of sales that occurred for the item during the 24-hour period ending with the hour in question. For example, row 401 indicates that the Icy Sparks item has 5669 sales during the 24-hour period ending with the hour in question, giving it the sales rank value of 1 for that hour. The item identification column 433 may identify an item based on its name as shown, or based on identifiers of other types, including such unique identifiers as the ISBN numbers assigned to books. In various embodiments, the number of sales shown in column 432 is determined in a variety of ways. In some embodiments, this number is the number of orders placed for the item during the hour in question. In some embodiments, in computing this number, the facility treats a single order for multiple copies of this item as a single order, while another embodiment counts such an order as multiple orders. In other embodiments of the facility, this number reflects the completion of different actions, such as the number of sales completed for the item, the number of items shipped, or the number of page views for detailed information about the item.

FIG. 5 is a table diagram showing a typical sales acceleration table used by the facility. The sales acceleration table contains information used by the facility to calculate acceleration scores for items. The table 500 is comprised of rows, such as rows 501–503, each corresponding to an item in a particular item category, here the Books item category. Each row is divided into an acceleration score column 511, and item identification column 512, and hourly sales rank column 513a–513x. Each hourly sales rank column contains a sales rank value for the item in one of the 25 immediately preceding hours. For example, the sales rank values in column 513a for hour $h_{-1}$ are sales rank values for the most recent complete hour, while the hourly sales rank values in column 513k for hours $h_{-11}$ are the sales rank values for the hour that is 10 hours earlier than the most recent hour. In reviewing row 501, it can be seen that the Icy Sparks item had a sales rank value of 1 in hour $h_{-1}$, and that, over the last 24 hours, the sales rank values of the Icy Sparks item have ranged from 1 in hour $h_{-1}$ to 263 in hour $h_{-23}$. The facility uses these two sales rank values to calculate an acceleration score for the Icy Sparks item, by subtracting the most recent sales rank value from the highest (i.e., worst) sales rank value, then dividing by the most recent sales rank value. Here, that expression is (263−1)/1, or 262. This score is shown in the acceleration score column 611 as a percentage, 26,200%. The other acceleration scores in the table are computed similarly. In some embodiments (not shown), the sales acceleration table also contains the number of orders for each item in the most recent 24-hour period shown in column 432 in FIG. 4 for use in determining whether each item satisfies the sales volumn threshold discussed below in conjunction with step 604.

While FIGS. 4 and 5 show tables whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

FIG. 6 is a flow diagram showing steps typically performed by the facility in order to score items in item categories to identify items whose sales performance has recently increased the most. The facility loops through step 601–608 once for each hour that passes. In step 602–607, the facility loops through each item category. In step 603, the facility determines the hourly sales rank for items of the current category during the last complete hour. In alternative embodiments, the facility obtains this hourly sales rank from an external source rather than determining it itself. In step 604, the facility selects items in the current category that satisfy both of the following conditions: (1) their sales rank values are less than (better than) a sales rank value threshold, such as 100,000; and (2) their sales volumes are greater than a sales volume threshold, which in some embodiments is determined separately for each category based upon typical sales volume levels in that category. In step 605, the facility determines the hourly acceleration score for the item selected in step 604. This generally involves employing a formula such as the formula discussed above in conjunction in FIG. 6. In step 606, the facility publishes a list of the items selected in step 604 based upon the scores determined in step 605. This list may include numerical or other indications of the determined scores, and/or may be ordered in accordance with the determined scores. Publishing this list may involve making a web page containing this list available as part of the web merchant's website, sending an electronic mail message containing this list, syndicating the list for display by third parties, making the list available for public download, or utilizing any of a host of other techniques for communicating this list to customers and potential customers. In step 607, if additional item categories remain to be processed, the facility continues in step 602 to process the next item category. In step 608, after the next hour has elapsed, the facility continues in step 601 to process the next hour.

Those skilled in the art will appreciate that the steps shown in FIG. 6 may be altered in a variety of ways. For example, the order of the steps may be rearranged; substeps may be performed in parallel; shown steps may be omitted, or other steps may be included; etc.

It will be understood by those skilled in the art that the above-described facility could be adapted or extended in various ways. For example, the facility may be used by web sites other than those of web merchants and may be used by merchants in settings other than the web. The facility may be used to display information about items of virtually any type, using a wide variety of selection methods. Further, a variety of well-known implementation techniques may be substituted for those described herein. While the foregoing description makes reference to preferred embodiments, the scope of the invention is defined solely by the claims that follow and the elements recited therein.

We claim:

1. A method in a computing system for displaying ordering information about items ordered from a web merchant, comprising:

for each of a plurality of time periods,
in the computing system, determining a sales ranking, in which a rank value is attributed to at least a subset of items that may be ordered from the web merchant, each rank value reflecting the number of orders placed for the corresponding item during the current time period, a smaller rank value reflecting a larger number of orders than a larger rank value;
in the computing system, selecting items having a current rank value that is less than a rank value threshold and for which more than a threshold number of orders were placed during the current time period;

for each selected item:
in the computing system, identifying among the rank values of the selected item for a predetermined number of time periods immediately preceding the current time period a largest rank value;
in the computing system, determining a score for the selected item based upon the current rank value of the selected item and the largest rank value of the selected item, the score characterizing the increase in sales ranking undergone by the selected item; and
in the computing system, generating a display showing, for at least a portion of the selected items, an indication of the score determined for the selected item.

2. The method of claim 1 wherein the score determined for each selected item is the difference between the largest rank value of the selected item and the current rank value of the selected item, all divided by the largest rank value of the selected item.

3. The method of claim 1 wherein the score determined for each selected item is the difference between the largest rank value of the selected item and the current rank value of the selected item, all divided by the current rank value of the selected item.

4. The method of claim 1, further comprising repeating the method for each of a plurality of item categories.

5. The method of claim 1 wherein each item is a product available for purchase from the web merchant.

6. The method of claim 1 wherein all of the time periods have substantially equal length.

7. The method of claim 1 wherein the items are displayed in the order of their scores.

8. The method of claim 1, further comprising transmitting the generated display to a visitor to a web site operated by the web merchant.

9. A computer-readable medium having instructions to cause a computing system to display ordering information about items ordered from a web merchant comprising:

determining a sales ranking, in which a rank value is attributed to at least a subset of items that may be ordered from the web merchant, each rank value reflecting the number of orders placed for the corresponding item during the current time period, a smaller rank value reflecting a larger number of orders than a larger rank value;

selecting items having a current rank value that is less than a rank value threshold and for which more than a threshold number of orders were placed during the current time period;

for each selected item:

identifying among rank values of the selected item for a predetermined number of time periods immediately preceding the current time period a largest rank value;

determining a score for the selected item based upon the current rank value of the selected item and the largest rank value of the selected item, the score characterizing the increase in sales ranking undergone by the selected item; and generating a display showing, for at least a portion of the selected items, an indication of the score determined for the selected item.

10. A method in a computing system for displaying consumption information about items, comprising:

in the computing system, from a current sales ranking for each of a plurality of items and one or more previous sales rankings for each of the plurality of items, the current sales rankings reflecting sales of each item during a recent distinguished time period and the previous sales rankings reflecting sales of each item during one or more time periods preceding the distinguished time period, attributing to at least a portion of the plurality of items a score characterizing the increase in the sales ranking of the item; and in the computing system, generating a display incorporating at least a portion of the attributed scores and the corresponding items.

11. The method of claim 10, further comprising generating the sales rankings used to attribute scores to items.

12. The method of claim 10, further comprising retrieving the sales rankings used to attribute scores to items.

13. The method of claim 10 wherein each attributed score further reflects a sales rankings reached by the item.

14. The method of claim 10 including filtering the items to which a score is attributed to eliminate items with a current sales ranking higher than a threshold.

15. The method of claim 10 including filtering the items to which a score is attributed to eliminate items for which less than a threshold number of orders were placed during a current distinguished time period.

16. A computing system for displaying consumption information about items, comprising:

a scoring subsystem that, from a current sales ranking for each of a plurality of items and one or more previous sales rankings for each of the plurality of items, the current sales rankings reflecting sales of each item during a recent distinguished time period and the previous sales rankings reflecting sales of each item during one or more time periods preceding the distinguished time period, attributes to at least a portion of the plurality of items a score characterizing the increase in the sales ranking of the item; and a display generation subsystem that generates a display incorporating indications of at least a portion of the attributed scores, together with indications of the corresponding items.

17. The system of claim 16 wherein the portion of the plurality of items does not include items with a current sales ranking greater than a threshold.

18. The system of claim 16 wherein the portion of the plurality of items does not include items for which lower than a threshold number of orders were received during a current distinguished time period.

* * * * *

UNITED STATES PATENT AND TRADEMARK OFFICE
CERTIFICATE OF CORRECTION

PATENT NO. : 7,058,599 B2  Page 1 of 1
APPLICATION NO. : 09/809728
DATED : June 6, 2006
INVENTOR(S) : Hanks et al.

It is certified that error appears in the above-identified patent and that said Letters Patent is hereby corrected as shown below:

<u>Column 1</u>
Line 44, "up and corners." should be --up and comers.--;

Signed and Sealed this

Second Day of January, 2007

JON W. DUDAS
*Director of the United States Patent and Trademark Office*